Figure 1:
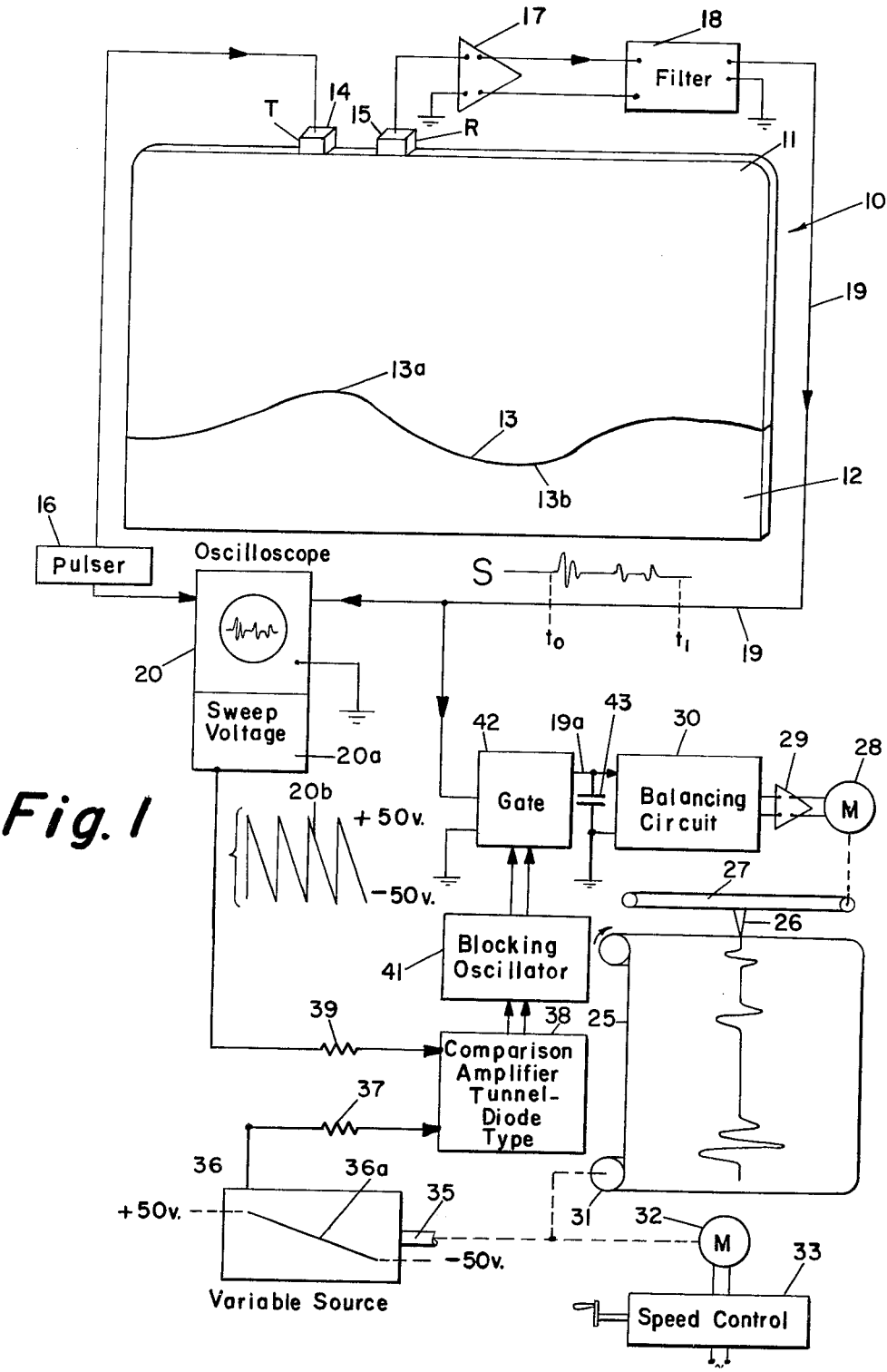

April 12, 1966     C. D. McCLURE     3,246,290
SEISMIC MODEL

Filed Dec. 7, 1962     2 Sheets-Sheet 1

April 12, 1966 C. D. McCLURE 3,246,290
SEISMIC MODEL
Filed Dec. 7, 1962 2 Sheets-Sheet 2

United States Patent Office 3,246,290
Patented Apr. 12, 1966

3,246,290
SEISMIC MODEL
Carroll D. McClure, Dallas, Tex., assignor to Socony
Mobil Oil Company, Inc., a corporation of New York
Filed Dec. 7, 1962, Ser. No. 243,134
3 Claims. (Cl. 340—15.5)

This invention relates to conversion systems by means of which seismic records obtained from "models" may be converted to seismograms on the same time base as would be utilized had the seismic records been taken along or over a segment of the earth's surface.

In seismic surveying, geophones are spread along a line at spaced distances one from the other. By detonating a small charge of dynamite or otherwise generating acoustic energy, seismic waves travel downwardly through the earth and a part of the seismic energy is reflected and refracted at interfaces in the earth of differing velocity or impedance and are returned to the surface to be detected for the production of seismic records. These seismograms take the form of an oscillographic record in which each trace is normally quiescent but which responds to the reflections as bursts of energy arrive at each detector. Though the recording may be done on magnetic tape or on other reproducible media, the present invention will be described in terms of photographic records of the kind normally utilized.

In order better to interpret seismograms, there has been developed the use of "models" to simulate the various discontinuities, velocity contrasts, or impedance contrasts which are known to be present below the earth's surface. For example if plates of copper and steel are bonded together with an irregular but predetermined configuration in the regions where they meet, there will be made available velocity contrasts between the region above and below the line of meeting of these two dissimilar materials. If now, on this model or scaled-down arrangement representative of a section of the earth's surface, there is utilized a transmitter and receiver, it will be understood that the resultant acoustic energy reflected from various parts of the meeting line will be received and reproduced on an oscilloscope to produce records similar to, but in time of much shorter duration than, those obtained in the field.

It is an object of the present invention to provide a system for transforming seismograms from a model or scaled-down representation of the earth to seismograms on time scales and on amplitude scales comparable to those obtainable in the field.

It is a further object of the invention to produce artificially, from scaled-down representations of the earth model seismograms with the same amplitude and time scales as those of field seismograms so that they may be compared and the models or scaled-down representations adjusted until the artificially produced seismograms are similar to and hence indicative of the sub-surface being explored in the field.

In carrying out the invention in one form thereof the seismic record from the model is displayed on an oscilloscope. The sweep voltage used to spread the record across the face of the oscilloscope is saw-tooth in character. Advantage is taken of this fact in the operation of associated circuits with a monotonically or linearly varying voltage for sampling the oscilloscope record and for production of signals representative of those on the oscilloscope which are then applied to a seismogram tracing apparatus for reproduction on a chart on a time scale comparable to that used in obtaining field seismograms.

For further objects and advantages of the present invention reference is to be had to the following detailed description of the invention taken in conjuction with the accompanying drawings in which:

FIG. 1 diagrammatically illustrates one preferred form of my invention; and

Figure 2:
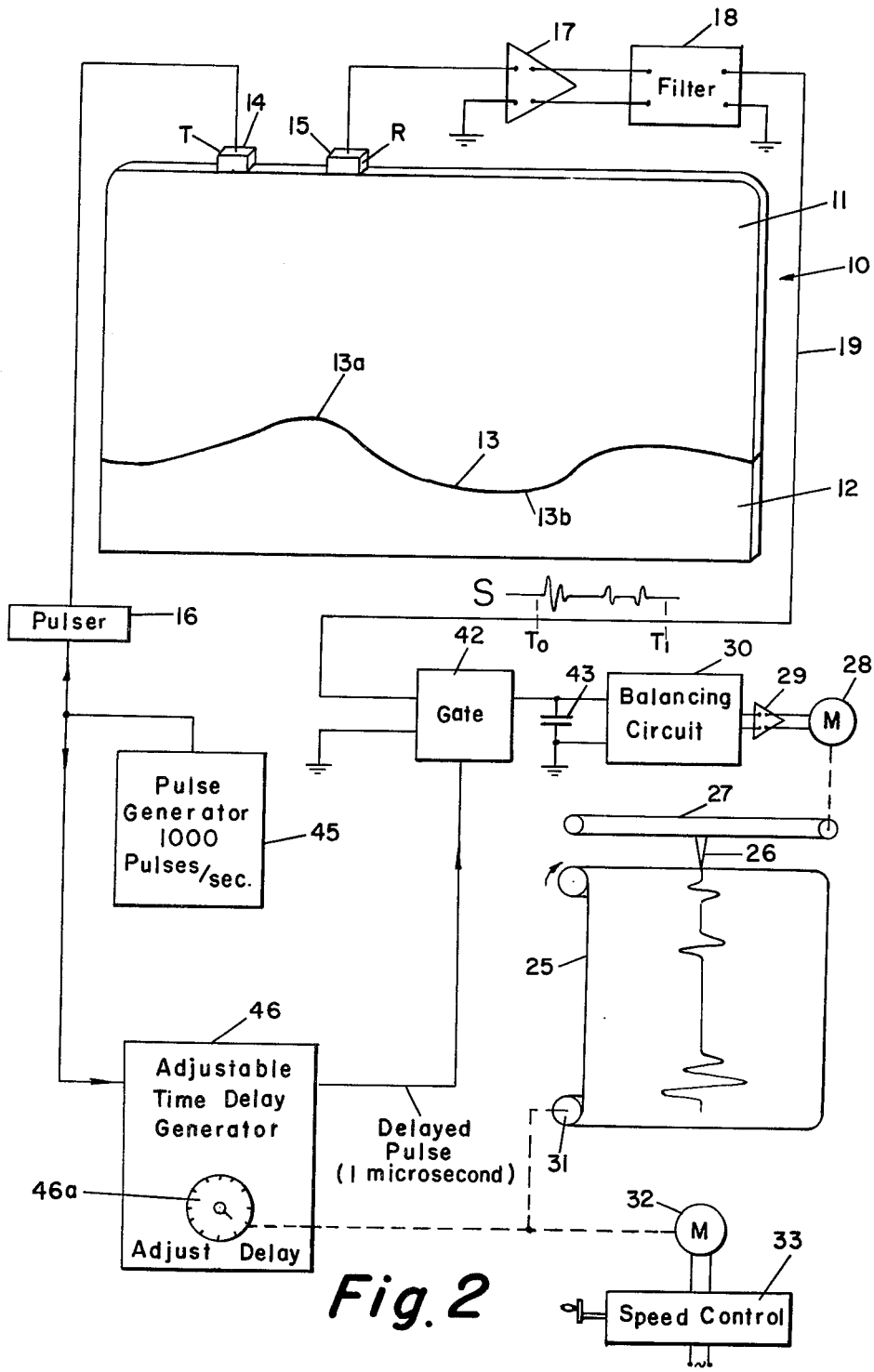

FIG. 2 illustrates diagrammatically another preferred form of my invention.

Referring now to FIG. 1, the invention has been shown applied to a model 10 comprising an upper section 11 which may be made of a selected material such, for example, a copper 1/16 of an inch thick. The lower section 12 may be made of steel 1/16 of an inch thick. These two materials are joined together along a contour line 13 having a shape which may be comparable to that of a contrasting velocity interface extending over a length of a sub-surface region of the earth. Thus the contour or meeting line 13 has an anticline 13a and a syncline 13b, two formations always of interest to those seeking oil and otherwise studying sub-surface structure. The two materials copper and steel are bonded together as, for example, with an epoxy resin to assure that there will be a continuous path for acoustic energy flowing from the copper section 11 to the steel section 12.

Acoustic energy is generated by a transmitter 14. That energy flows downwardly through the copper section 11, strikes the contour, or velocity contrast line, 13 and a part of it is reflected upwardly to a receiver 15. The transmitter 14 and receiver 15 are acoustically coupled to the upper edge of the copper section or plate 11. The acoustic coupling between the transmitter 14 and receiver 15 and the upper edge of plate 11 is achieved by the use of a drop of glycerine or oil between the transmitter 14 and the edge of plate 11 and between the receiver 15 and the edge of plate 11. Both transmitter and receiver may be moved along this edge and/or the distance between the two varied to reproduce the conditions carried out in the field by a dynamite charge or transmitter and a plurality of receivers or detectors normally and conventionally used in seismic surveying. To obtain a field seismogram, a single charge of dynamite is used to obtain a complete seismogram for a certain spacing between transmitter and receiver. To obtain a model seismogram, a pulser or pulsing system 16 is repetitively utilized to fire or energize the transmitter at selected intervals of time and with spaces therebetween much longer than required for the acoustic energy to travel to the contour line 13 and to be returned to the receiver 15. For each pulse from the transmitter 14, the receiver 15 applies to an amplifier 17 a signal that varies with time in the same manner as the detected reflected energy. The amplified signals are applied to an electrical filter 18 of a type similar to that customarily used in the field. It is evident that, while the electrical filter 18 used in model seismic work is similar in type to filters used in field seismic work, the frequencies used in model seismic work will be in the range of 10 kc. (kilocycles) to 500 kc. whereas the frequencies used in field seismic work will be in the range of 10 c.p.s. to 500 c.p.s. (cycles per second). After filtering, these signals are then applied by conductor 19 to an oscilloscope 20. The oscilloscope may be of conventional design though preferably it may be one corresponding with Model 166c of the Hewlett-Packard Company. It includes a section 20a for generating a sweep voltage illustrated at 20b for displaying the seismic energy received at receiver 15 across the display screen or face of the cathode ray tube forming part of the oscilloscope 20. Ordinarily the cathode ray tube of the oscilloscope will be relatively small say six to ten inches in diameter. On this cathode ray tube or screen thereof, there nevertheless will be displayed a reproduction, a seismogram, of the various signals detected by receiver 15.

In accordance with the present invention, there is reproduced on a different time base and on a selected amplitude scale the complete seismogram displayed by the oscilloscope 20. As shown, the seismogram is reproduced on a record chart 25 of an electronic balanceable type of recorder of a kind familiar to those skilled in the art. Preferably it may be a Moseley Strip Chart Recorder, known as the Autograf Model 80A. Associated with the chart 25 is a pen or stylus for producing the record on chart. This pen or stylus 26 is driven through a cord or violin string 27 carried by pulleys driven by a motor 28 forming a part of the recorder. It also includes an amplifier 29 and a balancing circuit 30 for controlling the energization of the motor 28 including its direction of rotation. The chart 25 is mounted on rolls, one of them, the roll 31, being driven by a motor 32 which may be provided with a speed controlling arrangement 33 of any conventional design. The speed controller may include regulation of the energization of motor 32 or it may include a variable speed drive between the motor and the chart drive roll 31, it being understood that the chart drive roll 31 and the shaft 35 are driven synchronously.

The variable voltage source 36 may take the form of a conventional variable resistor known in the art as a "Heli-pot." There appears across the face of the block representing the variable voltage source 36 a diagonal line 36a which represents the manner in which the voltage is varied from a +50 volts to a −50 volts. This variable voltage source 36 applies its output through a resistor 37 to a comparison amplifier 38 which may be of the tunnel-diode type for great sensitivity and fast response. Also applied to the comparison amplifier 38 by way of a resistor 39 is the sweep voltage 20b of the oscilloscope 20.

For the purpose of discussion and explanation of the circuit operation, additional information on the seismic models will be helpful. In a given seismic model the received signals of interest occupy only the 1000 microseconds of time immediately following the transmitter pulse. The oscilloscope sweep section 20a generates a sweep voltage 20b that varies from +50 v. to −50 v. in a time interval of 1000 microseconds or one millisecond. The time of one oscilloscope sweep will thus be 1 millisecond and there will be 1000 sweeps per second and 1000 transmitter pulses per second. Each transmitter pulse occurs at the beginning of each oscilloscope sweep. Each received model seismogram is displayed across the cathode ray tube. For situations in which the received model seismic signals are large as compared with the received noise signals, 1000 identical model seismograms will be displayed per second across the cathode ray tube. The purpose of the variable voltage source 36, comparison amplifier 38, blocking oscillator 41, and gate 42 is to take one signal voltage sample per sweep of the oscilloscope trace. Each signal voltage sample is taken at the precise time in each sweep when the voltage from the variable source 36 is identical with the instantaneous sweep voltage 20b. It is evident that one and only one sample of the received signal will be taken for each sweep of the oscilloscope.

In normal operation of the chart recorder, the chart paper 25 will be stationary prior to starting the recorder. In this case the output voltage from the variable source will be constant at +50 v. Each sample of the received signal will be taken at a fixed time near the start of each sweep when the sweep voltage is instantaneously +50 v. The recording pen 26 thus remains at a fixed position relative to the chart paper 25. With the motor 32 energized, the paper 25 will be moved forward, clockwise, and simultaneously the voltage output from the variable source 36 will slowly change with time from the starting voltage of +50 v. to the ending voltage of −50 v. Thus gate 42 will open at successively later and later times with respect to the beginning of each successive oscilloscope trace. Each successive sample of the voltage on conductor 19a is stored on a storage condenser 43 until the next sample is taken. Thus the voltage stored on condenser 43 will be altered approximately 1000 times per second by the repeated operation of gate 42.

The balancing circuit 30, amplifier 29, pen drive motor 28, and the pen 26 are actuated by or operated under the control of the varying voltage on storage condenser 43 so as to produce an ink trace of the model seismic signal repetitively produced on conductor 19. In this manner the seismic model received signal of 1 millisecond total duration has been effectively slowed-down and recorded in permanent form on a paper chart in a total chart recording time of 60 seconds. Since the paper chart 25 can be driven at any desired speed because of speed control 33, the permanent ink recording can be completed in any desired time even though each repetition of the received model seismic signal is of fixed one millisecond total time duration. By the above means it is practical to record a repetitively produced model seismogram which may contain frequencies of the order of 500 kc. on a chart recorder which is only capable of recording signal frequencies less than 2 c.p.s.

With the above understanding of the manner in which the comparison amplifier cooperates with a blocking oscillator 41 and a gate 42 connected to the conductor 19 for application to the gate 42 of the output from the filter 18, the following review of the operation as a whole will be clear. The speed of sound in copper is about 13,000 ft. per second. In steel the speed or velocity of sound is of the order of 18,000 ft. per second. In one seismic model the time of travel to the contour line 13 from transmitter and back to the receiver was of the order of 100 microseconds while the travel time to the lower edge and back was of the order of 150 microseconds. These times are quite short and hence the pulser may be operated at a rate far greater than the persistence of vision. It may be operated at say 1000 times a second with the sweep voltage 20b operating at the same rate. In practice, it will be preferable to utilize the return of the sweep voltage to trigger the pulsing device 16 so that at the instant the sweeping voltage begins to move the cathode ray across the screen of the oscilloscope 20 a pulse is produced at the transmitter 14. The seismic event then appears on the screen and can be seen there because it is repeated at the high rate of 1000 times a second. The variable source 36 may be assumed to have a value of +50 volts at the instant of the beginning of the seismic event. The sweep voltage then moves to a value of +50 volts and begins its sweep from that value to −50 volts. At the beginning it has the same value as that of the variable source 36. When the two are equal at approximately +50 volts there is an output from the comparison amplifier 38 which operates a blocking oscillator to open the circuit through the gate 42. This is an instantaneous operation. At the instant the gate 42 opens, any signal on line 19 passes through the gate 42 and is applied to a storage condenser 43. The balancing circuit 30 measures the magnitude of the stored voltage and moves the pen 26 to a position on the chart proportional to the stored voltage. On conductor 19 there has been illustrated a typical seismic signal S. The effect of the foregoing is to sample at successive points the repetitive seismic signal from the seismic model 10 and to apply successively to the balancing circuit 30 such instantaneous values or samplings of the seismic signal S. Accordingly the position of the pen 26 across the chart 25 is always proportional to the amplitude of the seismic signal S at a corresponding sampling point. By now adjusting the speed of the motor 32 to drive the chart so that throughout the time occurrence from $t_0$ to $t_1$ the chart traverses a distance equal to that of the chart of a typical field seismogram, the seismic record from the model 10 is transformed into a seismogram having the same time base and length as the seismogram obtained in the field in explorations carried out over the earth's surface.

An alternative means of achieving the objects of this invention is shown in FIG. 2. This figure includes a pulse generator 45, and an adjustable time delay generator 46.

The pulse generator 45 delivers to pulser 16 and to adjustable time delay generator 46 pulses at the rate of 1000 per second. A delayed output pulse from adjustable time delay generator 46 is used to actuate the electronic gate 42 and thus stores a sample of the model seismic signal on storage condenser 43. The time delay of the adjustable time delay generator 46 is adjustable from 0 to 1000 microseconds by means of the front panel knob 46a. Since this knob is driven in synchronism with the motor 32 by means of a servo or mechanical link shown by the broken line, the delayed output pulse from the adjustable time delay generator 46 is delayed by a time proportional to the extent of rotation of motor 32 and thus proportional to the downward motion of chart 25. As the chart 25 moves downward, each successive sample of the model seismic signal is stored on storage condenser 43 by successive actuations of gate 42 by the delayed output pulses from adjustable time delay generator 46. The voltage stored on storage condenser 43 is thus altered 1000 times per second by the successive firings of gate 42. As the stored voltage slowly changes in magnitude the balancing circuit 30, amplifier 29, pen drive motor 28 and violin string 27 move the pen 26 to the right or left so that the model seismogram is thereby traced on the chart 25. The Tektronix Type 181 Time-Mark Generator is suitable as the pulse generator 45 while a Rutherford Model A2 Time Delay Generator is suitable for the adjustable time delay generator 46. Since the relationship between delay time in microseconds and rotation of front panel knob is linear, ten revolutions of the front panel knob cause a delay change of 1000 microseconds. Each hundredth of a revolution of the knob changes the delay one microsecond and each complete revolution of the knob changes the delay 100 microseconds.

Certain of the items numbered 10 through 43 in FIG. 1 are also shown with the same numbers in FIG. 2. The function of each of these items is in each case the same in FIG. 2 as in FIG. 1.

Now that two modifications of the invention have been described, it will be understood that many variations may be made within the scope of the appended claims. Besides changes in the manner of sampling the model seismogram as already explained, the model itself may take various forms. Thus it may be of a single material with a contour line or lines produced by thinning or thickening the material along the region of the line 13 and throughout a selected vertical height thereof. The receiver and transmitter may be moved together selected distances to achieve with a fixed spacing therebetween traverse along the upper edge of the plate or sheet 11. For each new location of transmitter 14 and of receiver 15 a new seismogram will be produced and sampled. These may be recorded on chart 25 in side-by-side relation by simply starting each new operation at the same point on the chart. For wider spacings between transmitter 14 and receiver 15, refraction records will be obtained.

What is claimed is:

1. In combination with a seismic model,
    a transmitter for applying acoustic energy to said model,
    a receiver for detecting energy returned by said model,
    a cathode-ray type oscilloscope connected to said receiver for displaying signals from said receiver, said oscilloscope having means for generating a sweep voltage,
    means including a pulser for said transmitter operable each time said sweep voltage initiates a sweep of the beam of the cathode ray across the screen of said oscilloscope,
    a recorder having recording means for producing a record on a recording medium during the time it is driven through a distance approximating the length of a field seismogram,
    means for controlling said recording means for producing said record in response to a succession of displays of said seismic signal by said oscilloscope, said means including a comparison amplifier, a blocking oscillator and a gate,
    connections for applying said sweep voltage to said comparison amplifier, and
    a variable voltage source operable in timed relation with said recording medium for varying the voltage applied to said amplifier for developing a multiplicity of sampling points at successively differing time intervals of said seismic signal on successive displays thereof to produce on said recording medium a seismogram with a time base corresponding with that utilized in field operations.

2. A conversion system for converting seismic signals from scale models to seismograms having the same time base as seismograms taken in the field, which comprises
    a seismic model including materials of differing impedance characteristics on opposite sides of a meeting line of selected configuration,
    a transmitter coupled to said model for generating acoustic energy,
    a receiver coupled to said model for receiving acoustic energy reflected from the meeting line of said materials for producing a time-varying voltage proportional to the received energy,
    pulsing means for repetitively energizing said transmitter at a high repetition rate,
    recording means,
    a gate connected between said receiver and said recording means,
    means operable under the control of said pulsing means for controlling said gate to apply to said recording means instantaneous values each at successively different time intervals of said time-varying voltage from said model, said recording means having a chart, and
    means for driving said chart at a speed which produces a seismogram from said model on a time scale corresponding with that of a field seismogram.

3. A conversion system for converting seismic signals from scale models to seismograms having the same time base as seismograms taken in the field which comprises a seismic model including materials of differing impedance characteristics on opposite sides of a meeting line of selected configuration,
    a transmitter coupled to said model for generating acoustic energy,
    a receiver coupled to said model for receiving acoustic energy reflected from the meeting line of said materials for producing a time-varying voltage proportional to the received energy,
    means including an oscilloscope for displaying seismic signals detected from said receiver, said oscilloscope having means for generating a sweep voltage of sawtooth character,
    a pulser controlled by said sweep voltage for energizing said transmitter at the beginning of each sweep of said oscilloscope,
    means for producing a voltage varying linearly over the same range as said sweep voltage,
    means for comparing instantaneous values of said variable voltage with changing values of corresponding segments of said sawtooth voltage,
    recording means,
    means operable under the control of said comparison means for applying to said recording means instantaneous values at successively differing time intervals of the seismic signals from said model, said recording means having a chart, and
means for driving said chart at a speed which produces a seismogram from said model on a time scale corresponding with that utilized in field seismograms.

References Cited by the Examiner

UNITED STATES PATENTS

| | | | |
|---|---|---|---|
| 2,834,422 | 5/1958 | Angona | 181—0.5 |
| 2,885,023 | 5/1959 | Walker | 181—0.5 |
| 2,977,680 | 4/1961 | Halverson | 181—0.5 |
| 3,009,527 | 11/1961 | Berryman et al. | 181—0.5 |
| 3,034,593 | 5/1962 | Summers | 181—0.5 |
| 3,039,558 | 6/1962 | Romberg | 181—0.5 |
| 3,047,965 | 8/1962 | Walker et al. | 181—0.5 |
| 3,142,750 | 7/1964 | Silverman et al. | 340—15.5 X |
| 3,154,169 | 10/1964 | Boucher | 181—0.5 |
| 3,159,231 | 12/1964 | Silverman | 181—0.5 |
| 3,176,263 | 3/1965 | Douglas | 181—0.5 |

BENJAMIN A. BORCHELT, *Primary Examiner.*

CHESTER L. JUSTUS, *Examiner.*

R. M. SKOLNIK, *Assistant Examiner.*